(12) United States Patent
Nakajo (10) Patent No.: US 7,031,241 B2
(45) Date of Patent: Apr. 18, 2006

(54) METHOD OF ADJUSTING RECORD SIGNAL WAVEFORM OF OPTICAL DISK, METHOD OF STORING RECORD SIGNAL WAVEFORM ADJUSTMENT DATA, AND OPTICAL DISK RECORDER

(75) Inventor: Yukihisa Nakajo, Yokohama (JP)

(73) Assignee: Yamaha Corporation, Hamamatsu (JP)

(*) Notice: Subject to any disclaimer, the term of this patent is extended or adjusted under 35 U.S.C. 154(b) by 337 days.

(21) Appl. No.: 10/208,289

(22) Filed: Jul. 30, 2002

(65) Prior Publication Data

US 2003/0142603 A1 Jul. 31, 2003

(30) Foreign Application Priority Data

Jul. 31, 2001 (JP) ............................. 2001-230936

(51) Int. Cl.
*G11B 7/00* (2006.01)

(52) U.S. Cl. ................................. 369/53.2; 369/59.12

(58) Field of Classification Search .............. 369/53.2, 369/53.22, 59.12, 59.11, 47.52, 47.51, 59.2
See application file for complete search history.

(56) References Cited

U.S. PATENT DOCUMENTS

| 6,535,470 | B1* | 3/2003 | Wu | 369/53.3 |
|---|---|---|---|---|
| 6,661,759 | B1* | 12/2003 | Seo | 369/59.11 |
| 6,704,269 | B1* | 3/2004 | Ogawa | 369/116 |
| 6,778,478 | B1* | 8/2004 | Mashimo et al. | 369/47.53 |
| 2002/0167878 | A1* | 11/2002 | Nagano | 369/59.11 |

* cited by examiner

*Primary Examiner*—William Klimowicz
*Assistant Examiner*—Lixi Chow
(74) *Attorney, Agent, or Firm*—Pillsbury Winthrop Shaw Pittman LLP (57) ABSTRACT

A plurality type of adjustment data groups are stored in a memory for each of a plurality of adjustment items for adjusting a record signal waveform. The adjustment data group for each adjustment item is selected in accordance with identification information preset in accordance with a disk type and a record velocity magnification factor. The selected adjustment data groups are combined to form a record strategy. The record signal waveform is adjusted in accordance with the formed record strategy to record the record signal in an optical disk. It is possible to reduce the amount of adjustment data for the record signal waveform to be stored in the memory.

16 Claims, 6 Drawing Sheets

FIG.2

METHOD OF ADJUSTING RECORD SIGNAL WAVEFORM OF OPTICAL DISK, METHOD OF STORING RECORD SIGNAL WAVEFORM ADJUSTMENT DATA, AND OPTICAL DISK RECORDER

CROSS REFERENCE TO RELATED APPLICATION

This application is based on Japanese Patent Application No. 2001-230936, filed on Jul. 31, 2001, the entire contents of which are incorporated herein by reference.

BACKGROUND OF THE INVENTION

A) Field of the Invention

The present invention relates to a method of adjusting a record signal waveform of an optical disk, a method of storing record signal waveform adjustment data and an optical disk recorder, intending to reduce the amount of adjustment data to be stored in a memory.

B) Description of the Related Art

There are many recordable or rewritable optical disks: recordable or rewritable type CD's such as CD-R and CD-RW and recordable or rewritable type DVD's such as DVD-R and DVD-RW. Even if a laser beam is driven by the same record signal, record film sensitivity and heat conduction of each optical disk become different depending upon a disk type (not a format but a record film material, a maker, a product type number, and the like under the same format). Therefore, the front and back positions of each pit and land change with the disk type and the characteristics of reproduced signals such as jitter (shift in a time axis direction) and deviation (from a normal signal length) become different. It is necessary to adjust the time axis and level of a record signal waveform in accordance with the disk type in order to always ensure an optimum record quality.

Conventionally, adjustment data (so-called record strategy) for each disk type supplied by a maker is stored in a memory of an optical disk recorder. When data is recorded in an optical disk, the disk type is judged and the corresponding record strategy data is read from the memory to adjust the time axis, level and the like of a record signal waveform. A plurality of adjusting items are generally adopted to adjust a record signal waveform. A conventional optical disk recorder stores adjustment data of each item in the memory for each of disk types.

Along with prevailing recordable or rewritable type optical disks, the number of disk types (particularly the number of makers) of commercial disks is increasing and the amount of adjustment data stored in a memory is increasing. A record velocity magnification factor of an optical disk recorder can be set by a user. Since proper adjustment data changes with the record velocity magnification factor even with the same disk type, it is necessary to store adjustment data for each record velocity magnification factor in the memory. Recently, the number of record velocity magnification factors which can be set by a user is gradually increasing and the amount of adjustment data to be stored in the memory for each disk type is increasing. A large capacity memory is therefore required. One approach to reducing the amount of adjustment data is to group disk types together and use the same record strategy for each group. However, it is difficult to set suitable adjustment data for each of all items of each of all disk types in the same group.

SUMMARY OF THE INVENTION

An object of this invention is to provide a method of adjusting a record signal waveform of an optical disk, a method of storing record signal waveform adjustment data and an optical disk recorder, capable of properly adjusting a record signal waveform for each adjustment item of each disk type and reducing the amount of adjustment data to be stored in a memory.

According to one aspect of the present invention, there is provided a method of adjusting a record signal waveform of an optical disk, comprising the steps of: preparing a plurality type of adjustment data for each of a plurality of adjustment items for adjusting a record signal waveform, the adjustment data being able to be identified and shared by a plurality of disk types; selecting the adjustment data corresponding to each adjustment item in accordance with a combination of selection information of the adjustment data, the combination being preset in accordance with the disk type; and adjusting the record signal waveform in accordance with the adjustment data selected in accordance with the combination of selection information of the adjustment data.

Disks of the disk type of the same maker and pigment and only a different product type number have different values of the adjustment data of some adjustment items and the same values of other adjustment items in some cases. Such disks can share the adjustment data of the items having the same values so that the data amount to be stored in a memory can be reduced.

According to another aspect of the present invention, there is provided a method of adjusting a record signal waveform of an optical disk, comprising the steps of: preparing a plurality type of adjustment data for each of a plurality of adjustment items for adjusting a record signal waveform, the adjustment data being able to be identified and shared by a plurality of record velocity magnification factors; selecting the adjustment data corresponding to each adjustment item in accordance with a combination of selection information of the adjustment data, the combination being preset in accordance with the record velocity magnification factor; and adjusting the record signal waveform in accordance with the adjustment data selected in accordance with the combination of selection information of the adjustment data.

Even if the record velocity magnification factors of disks of the same disk type are different, values of the adjustment data of some adjustment items are different and values of other adjustment items are the same in some cases. Such record velocity magnification factors can share the adjustment data of the items having the same values so that the data amount to be stored in a memory can be reduced.

According to a further aspect of the present invention, there is provided a method of adjusting a record signal waveform of an optical disk, comprising the steps of: preparing a plurality type of adjustment data for each of a plurality of adjustment items for adjusting a record signal waveform, the adjustment data being able to be identified and shared by a plurality of disk types and record velocity magnification factors; selecting the adjustment data corresponding to each adjustment item in accordance with a combination of selection information of the adjustment data, the combination being preset in accordance with the disk type and record velocity magnification factor; and adjusting the record signal waveform in accordance with the adjustment data selected in accordance with the combination of selection information of the adjustment data.

A plurality of disk types and record velocity magnification factors can share the adjustment data of the items having the same values so that the data amount to be stored in a memory can be reduced.

According to another aspect of the present invention, there is provided a method of storing record signal waveform adjustment data of an optical disk, comprising the steps of: preparing a plurality type of adjustment data for each of a plurality of adjustment items for adjusting a record signal waveform, and storing the adjustment data in a memory in such a manner that the adjustment data can be identified and shared by a plurality of disk types; and storing in another memory combination information of selection data of the adjustment data to be used by each adjustment item in accordance with the disk type.

According to still another aspect of the present invention, there is provided a method of storing record signal waveform adjustment data of an optical disk, comprising the steps of: preparing a plurality type of adjustment data for each of a plurality of adjustment items for adjusting a record signal waveform, and storing the adjustment data in a memory in such a manner that the adjustment data can be identified and shared by a plurality of record velocity magnification factors; and storing in another memory combination information of selection data of the adjustment data to be used by each adjustment item in accordance with the record velocity magnification factor.

According to still another aspect of the present invention, there is provided a method of storing record signal waveform adjustment data of an optical disk, comprising the steps of: preparing a plurality type of adjustment data for each of a plurality of adjustment items for adjusting a record signal waveform, and storing the adjustment data in a memory in such a manner that the adjustment data can be identified and shared by a plurality of disk types and record velocity magnification factors; and storing in another memory combination information of selection data of the adjustment data to be used by each adjustment item in accordance with the record type and record velocity magnification factor.

According to another aspect of the present invention, there is provided an optical disc recorder comprising: a storage device that stores a first table storing a plurality type of adjustment data for each of a plurality of adjustment items for adjusting a record signal waveform, the adjustment data being able to be identified and shared by a plurality of disk types, and a second table storing combinations of selection information of the adjustment data of each adjustment item to be used in accordance with the disk type; and a record signal adjusting device that reads the combination of the selection information of the adjustment data to be used for each adjustment item from the second table in accordance with the disk type, selects the adjustment data corresponding to each adjustment item from the first table in accordance with the combination of the selection information of the adjustment data, and adjusts the record signal waveform in accordance with the adjustment data selected in accordance with the combination of the selection information.

According to still another aspect of the present invention, there is provided an optical disc recorder comprising: a storage device that stores a first table storing a plurality type of adjustment data for each of a plurality of adjustment items for adjusting a record signal waveform, the adjustment data being able to be identified and shared by a plurality of record velocity magnification factors, and a second table storing combinations of selection information of the adjustment data of each adjustment item to be used in accordance with the record velocity magnification factor; and a record signal adjusting device that reads the combination of the selection information of the adjustment data to be used for each adjustment item from the second table in accordance with the record velocity magnification factor, selects the adjustment data corresponding to each adjustment item from the first table in accordance with the combination of the selection information of the adjustment data, and adjusts the record signal waveform in accordance with the adjustment data selected in accordance with the combination of the selection information.

According to still another aspect of the present invention, there is provided an optical disc recorder comprising: a storage device that stores a first table storing a plurality type of adjustment data for each of a plurality of adjustment items for adjusting a record signal waveform, the adjustment data being able to be identified and shared by a plurality of disc types and record velocity magnification factors, and a second table storing combinations of selection information of the adjustment data of each adjustment item to be used in accordance with the disc type and record velocity magnification factor; and a record signal adjusting device that reads the combination of the selection information of the adjustment data to be used for each adjustment item from the second table in accordance with the disk type and record velocity magnification factor, selects the adjustment data corresponding to each adjustment item from the first table in accordance with the combination of the selection information of the adjustment data, and adjusts the record signal waveform in accordance with the adjustment data selected in accordance with the combination of the selection information.

DESCRIPTION OF THE PREFERRED EMBODIMENTS

Figure 2:
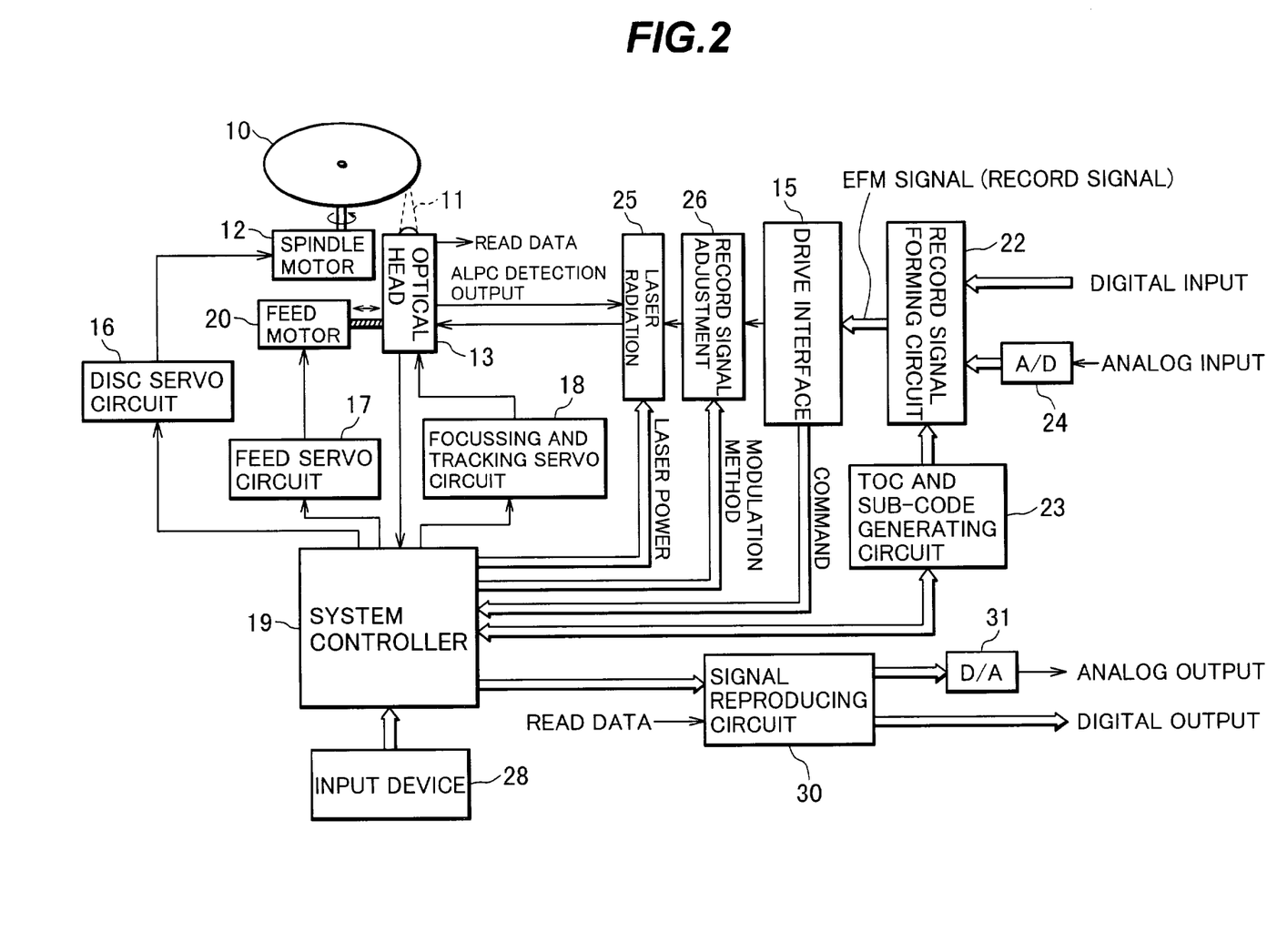
FIG. 2 is a block diagram showing the system structure of an optical disk recording/reproducing apparatus to which this invention is applied.

An embodiment of the invention will be described. FIG. 2 is a block diagram showing the system structure of an optical disk recording/reproducing apparatus 1 (e.g., a CD-R/RW drive capable of recording/reproducing a CD-R disk and a CD-RW disk) to which the invention is applied. A user sets a record velocity magnification factor from an input device 28. In response to a command from a system controller 19, a disk servo circuit 16 controls the revolution of a spindle motor 12 under constant linear velocity control at the set record speed magnification factor (1.2 m/s to 1.4 m/s at 1× velocity, two times faster than 1× velocity at 2× velocity, four times faster than 1× velocity at 4× velocity, . . . ). The CD-WO standard defines that a wobble of the pregroove should be detected at 22.05 kHz. In this case, therefore, the constant linear velocity control is realized through PLL control of the spindle motor 12 in such a manner that the wobble detected from the tracking error signal output from an optical head 13 should be detected at a predetermined frequency (22.05 kHz at 1× velocity, 44.1 kHz at 2× velocity, 88.2 kHz at 4× velocity, . . . ). In response to a command from the system controller 19, a focus and tracking servo circuit 18 controls the focusing and tracking of a laser beam 11 radiated from a semiconductor laser of the optical head 13 The tracking control is realized by detecting the pregroove formed in an optical disk 10. In response to a command from the system controller 19, a feed servo circuit 17 drives a feed motor to move the optical head along the radial direction of the optical disk 10.

An input signal to be recorded in the optical disk 10 is directly input to a record signal forming circuit 22 in the case of a digital input signal, and via an A/D converter 24 in the case of an analog input signal, respectively at a velocity corresponding to the record velocity magnification factor. The record signal forming circuit 22 interleaves the input data, adds error check codes and the TOC information and sub-code information generated by a TOC and sub-code generating circuit 23. The record signal forming circuit 22 EFM-modulates the input data to generate a series of serial data in accordance with the format of the CD standard and a transfer rate corresponding to the record velocity magnification factor, and outputs it as a record signal. This record signal is supplied via a drive interface 15 to a record signal adjustment circuit (record strategy circuit) 26. The record signal adjustment circuit 26 modulates the record signal in accordance with a record strategy formed by a combination of the disk type, record velocity magnification factor and the like, and outputs it to a laser generating circuit 25. The laser generating circuit 25 drives the semiconductor laser of the optical head 13 in accordance with the record signal waveform to apply a laser beam 11 to the record surface of the optical disk 10 and form pits. The laser power is controlled to have a value satisfying the record velocity magnification factor and if necessary the linear velocity. An automatic laser power control (ALPC) circuit in the optical head controls the laser power at high precision to have such a value. In this manner, data is recorded in the optical disk 10 in accordance with the format of the CD-WO standard, transfer rate and linear velocity (1.2 to 1.4 m/s). As a laser beam having a bottom power (reproduction power) is applied to the optical disk 10 recorded in the above manner, the record data can be read. The read record data is demodulated by a signal reproducing circuit 30 and directly output as a digital signal or output as an analog signal via a D/A converter 31.

Figure 1:
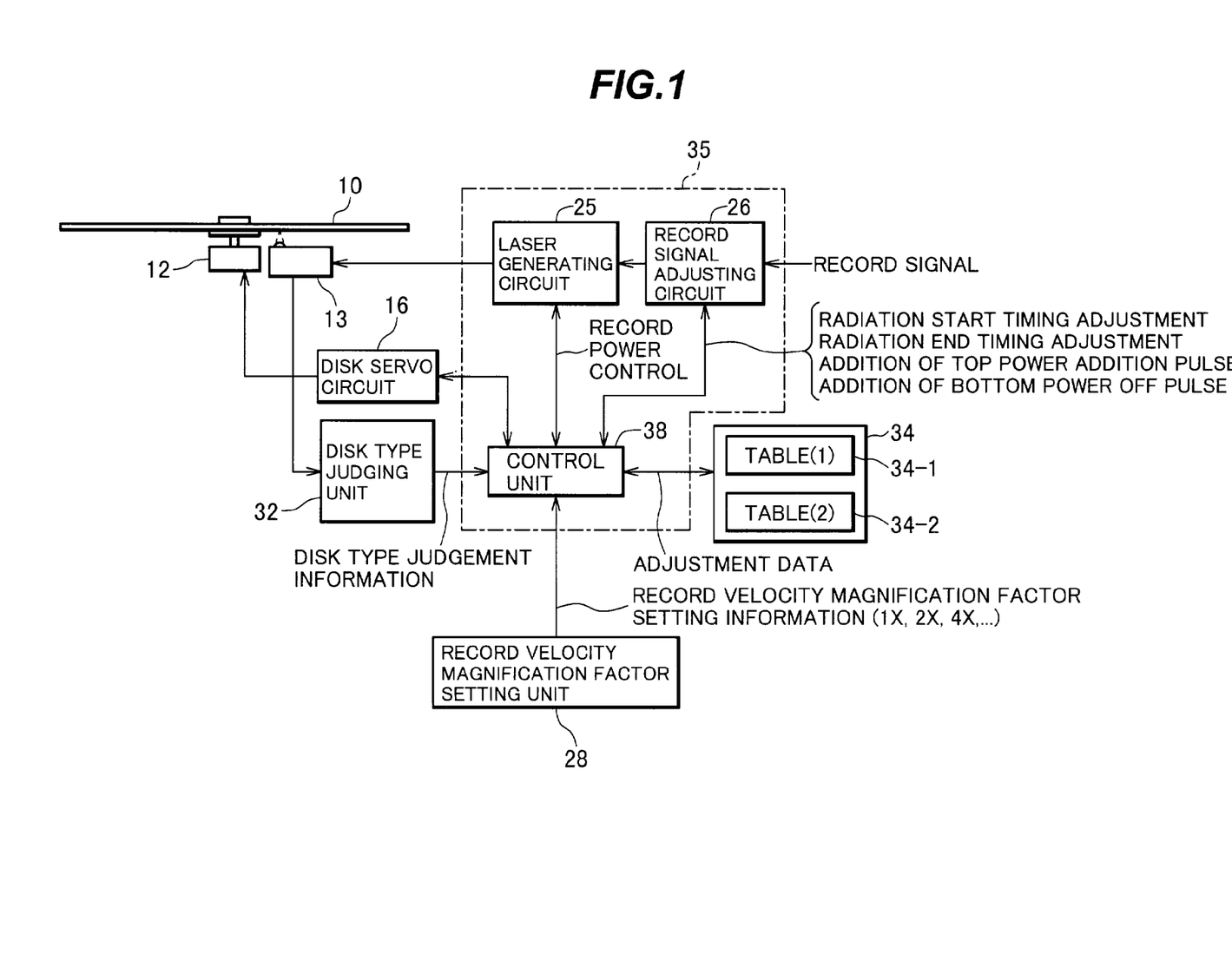
FIG. 1 is a block diagram illustrating a record control operation by a system controller 19 shown in FIG. 2.

FIG. 1 is a block diagram illustrating record control by the system controller 19 shown in FIG. 2. A record velocity magnification factor setting unit 28 corresponds to the input device 28 shown in FIG. 2. A user sets the record velocity magnification factor (1×, 2×, 4×, . . . ) from this setting unit 28. A disk type judging unit 32 judges the disk type of an optical disk 10 loaded in the apparatus. For example, the disk type can be judged by detecting the information representative of the disk type from a disk ID prerecorded in the optical disk 10. In a record signal adjusting unit 35, an adjustment data storage device 34 stores a plurality type of adjustment data for each of adjustment items for adjusting a record signal. The adjustment data storage device 34 has a first table 34-1 and a second table 34-2. The first table 34-1 stores a plurality of adjustment data groups for each of a pit length, land length and the like for each adjustment item.

The adjustment data groups are stored in such a manner that each adjustment data group can be identified and shared by a plurality of disk types and record velocity magnification factors. The second table 34-2 stores, for each of the disk type and record velocity magnification factor, data representative of combinations of selection information of the adjustment data groups to be applied to each adjustment item. The item which changes with the disk type and record velocity magnification factor and does not change with the pit length and land length can be stored directly in the second table 34-2.

A control unit 38 reads adjustment amount data for each adjustment item from the adjustment data storage device 34, in accordance with the input disk type and record velocity magnification factor. Namely, for the adjustment item whose adjustment amount data is stored in the first table 34-1, the selection information for each adjustment item is read from the second table 34-2 in accordance with the disk type and record velocity magnification factor, and in accordance with a combination represented by the selection information, the corresponding adjustment data group for each adjustment item is read from the first table. For the adjustment item whose adjustment amount data is directly stored in the second table 34-2, the adjustment amount data for each adjustment item is directly read from the second table 34-2. The control unit 38 forms a record strategy by combining the adjustment amount data of respective adjustment items read from the adjustment data storage device 34, and sets the record strategy to the record signal adjustment circuit 26. When data is recorded, the record signal adjustment circuit 26 adjusts portions of the time axis where pits or lands corresponding to sequentially input record signals are formed, in accordance with the set record strategy, and when necessary partially adds a pulse (top power addition pulse, bottom power off pulse or the like to be described later, refer to FIG. 6). A laser power is controlled by controlling the laser generating circuit 25. The disk servo circuit 16 is controlled to make the spindle motor 12 rotates at the velocity corresponding to a designated record velocity magnification factor.

A specific example of radiation time control of a laser beam having a top power (record power) to be executed by the record signal adjusting unit 35 shown in FIG. 1 will be described.

EXAMPLE 1

Figure 3:
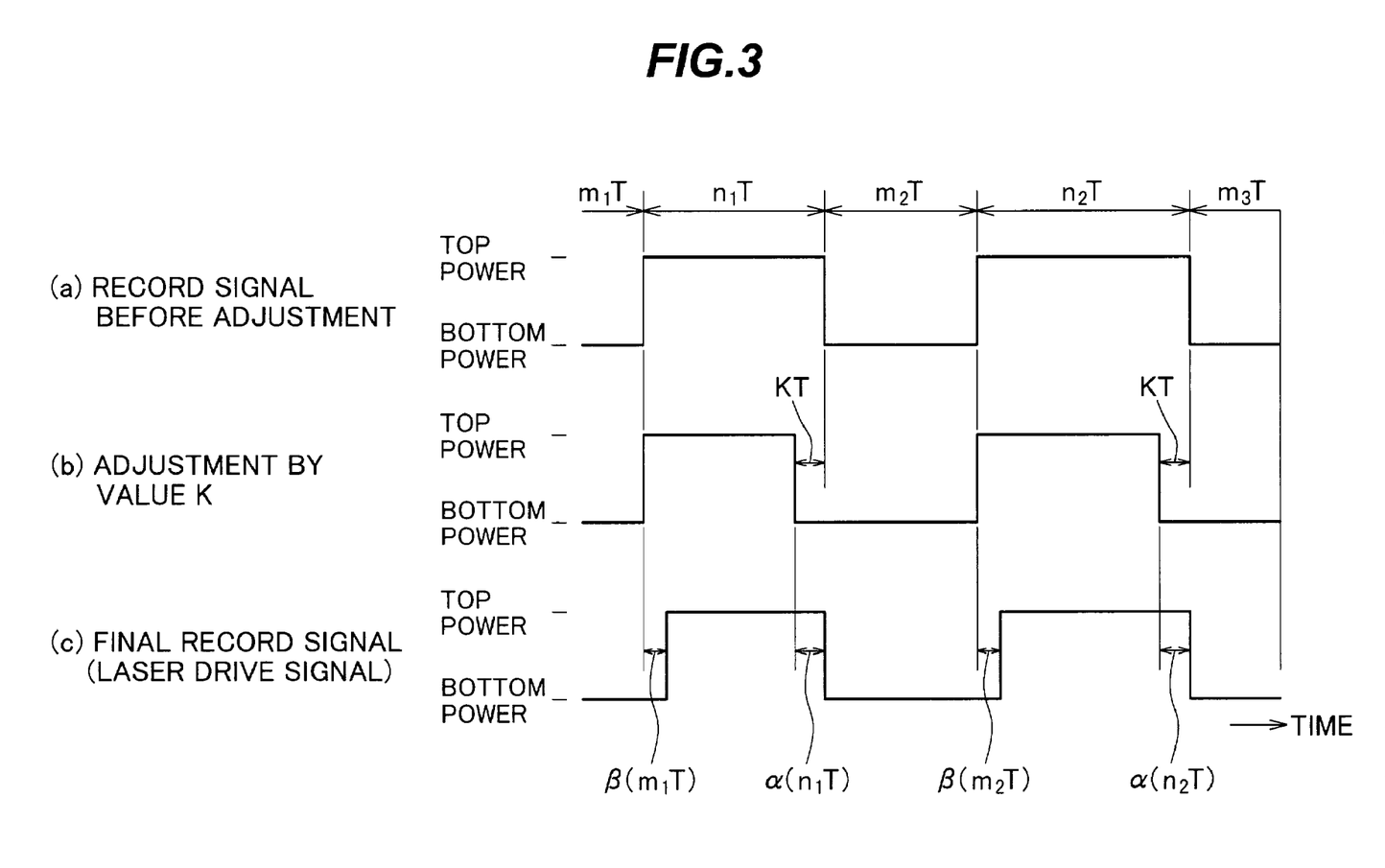
FIG. 3 is a waveform diagram illustrating the concept of time axis adjustment by a record strategy of $(n-K)T+\alpha(nT)-\beta(mT)$.

As a record strategy for a time axis, $(n-K)T+\alpha(nT)-\beta(mT)$ is used. FIG. 3 is a waveform diagram illustrating the concept of time axis adjustment by the record strategy of $(n-K)T+\alpha(nT)-\beta(mT)$. A record signal waveform indicated at (a) is before adjustment, a record signal waveform indicated at (b) is after adjustment by an adjustment item $-KT$, and a record signal waveform indicated at (c) and to be finally used for laser drive is after further adjustment by adjustment items $+\alpha(nT)$ and $-\beta(mY)$. The adjustment item $-KT$ at (b) adjusts the falling timing (laser beam radiation end timing) of the record signal waveform before adjustment at (a) in accordance with the disk type and record velocity magnification factor, and takes a constant value independently from a pit length and a land length. If the value K is positive, the falling timing is advanced (a record power continuation time is shortened), whereas if the value K is negative, the falling timing is delayed (a record power continuation time is prolonged). The adjustment item $+\alpha(nT)$ at (c) finely adjusts the end timing of the record signal adjusted by KT, in accordance with a pit length nT of a pit to be formed. If the value α(nT) is positive, the end timing is delayed, whereas if it is negative, the end timing is advanced. The adjustment item −β(mT) at (c) finely adjusts the start timing of the record signal in accordance with the blank length mT immediately before the pit to be formed. If the value β(mT) is positive, the start timing is delayed (a record power continuation time is shortened), whereas if it is negative, the start timing is advanced (a record power continuation time is prolonged).

Table 1 shows examples of a plurality type of data groups of the adjustment item α(nT) stored in the first table 34-1 of the correction data storage device 34. In Table 1, the value of the adjustment item α(nT) is represented by a ratio (%) relative to the value at 1T.

TABLE 1

| Data Group Name | α(nT) value Bit length nT | | | | | | | | |
|---|---|---|---|---|---|---|---|---|---|
| | 3T | 4T | 5T | 6T | 7T | 8T | 9T | 10T | 11T |
| A1 | 15% | 10% | 7% | 4% | 2% | 0% | 0% | 0% | 4% |
| A2 | 13% | 9% | 6% | 3% | 0% | 0% | 0% | 0% | 2% |
| A3 | 12% | 7% | 4% | 2% | 0% | 0% | 0% | 0% | 0% |

Table 2 shows examples of a plurality type of data groups of the adjustment item β(mT) stored in the first table 34-1 of the correction data storage device 34. In Table 2, the value of the adjustment item β(mT) is represented by a ratio (%) relative to the value at 1T.

TABLE 2

| Data Group Name | β(mT) value Preceding land length mT | | | | | | | | |
|---|---|---|---|---|---|---|---|---|---|
| | 3T | 4T | 5T | 6T | 7T | 8T | 9T | 10T | 11T |
| B1 | 8% | 5% | 2% | 0% | 0% | 0% | 0% | 0% | 0% |
| B2 | 6% | 5% | 2% | 0% | 0% | 0% | 0% | 0% | 0% |
| B3 | 4% | 2% | 0% | 0% | 0% | 0% | 0% | 0% | 0% |

Table 3 shows examples of data stored in the second table 34-2 of the record signal adjusting unit 35.

TABLE 3

| Disk ID | Record velocity magnification Factor | −K value | Data group name of α(nT) value | Data group name of β(mT) value |
|---|---|---|---|---|
| ID1 | 1x | −1.2 | A1 | B2 |
| | 4x | −0.5 | A1 | B2 |
| | 8x | −0.2 | A1 | B3 |
| | 12x | +0.2 | A2 | B3 |
| ID2 | 1x | −1.0 | A3 | B4 |
| | 4x | −0.4 | A3 | B5 |
| | 8x | 0 | A3 | B5 |

As seen from Table 3, in the second table 34-2, the value −K is stored for each of the disk type (disk ID) and record velocity magnification factor, the value of each adjustment item α(nT) is stored as the data group name (A1, A2, A3, . . . in Table 1) of the adjustment item α(nT) in the first table 34-1, and the value of each adjustment item β(mT) is stored as the data group name (B1, B2, B3, . . . in Table 2) of the adjustment item α(mT) in the first table 34-1 The data group name is an identifier of each data group, the identifier being used as information for selecting the data group.

Figure 4:
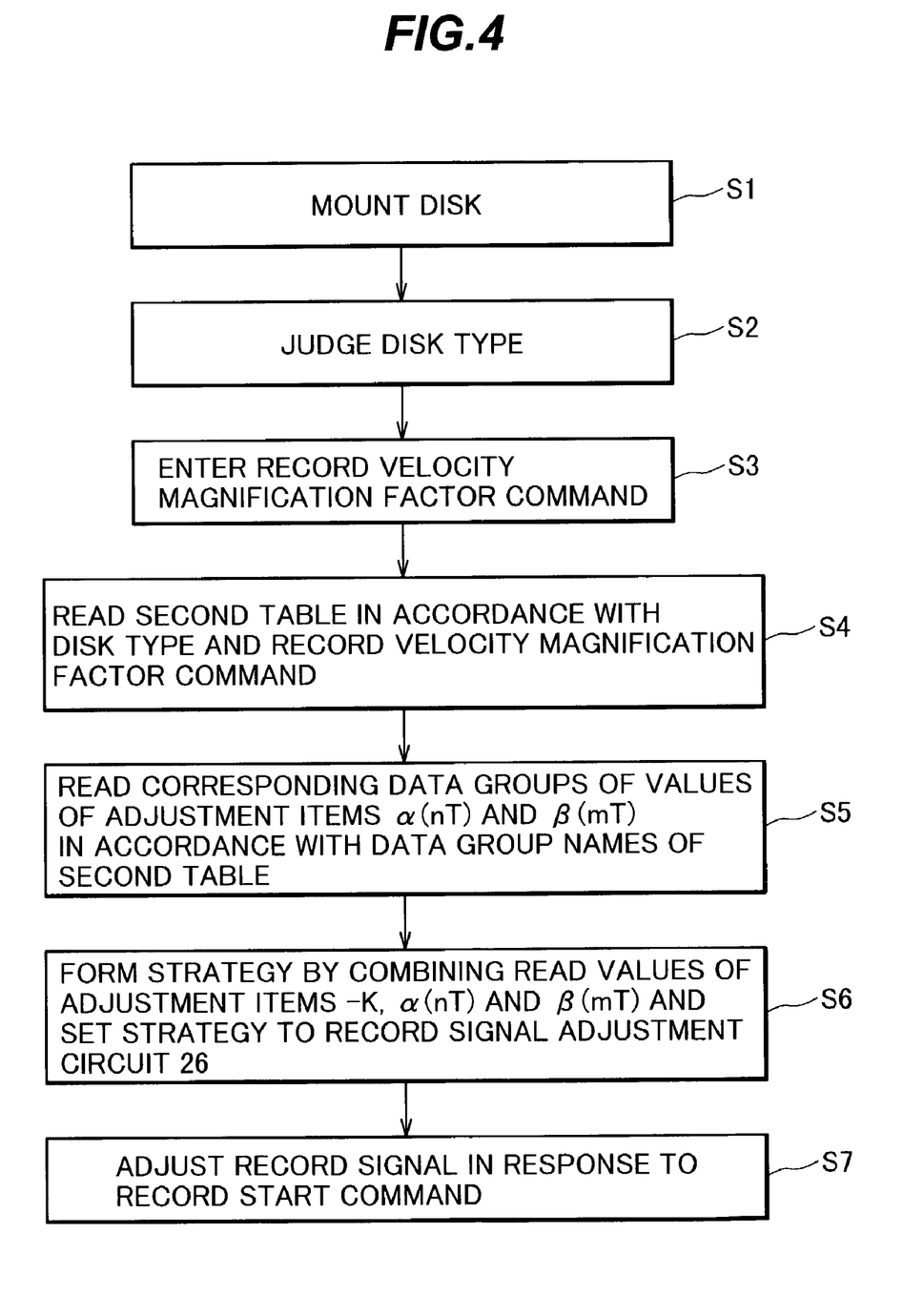
FIG. 4 is a flow chart illustrating adjustment control of a record signal by a control unit 38 shown in FIG. 1.

Adjustment control of a record signal by the control unit 38 will be described with reference to FIG. 4. When an optical disk 10 is set to the apparatus (S1), the disk type is judged from the disk ID (S2). Next, when an operator designates a record velocity magnification factor (S3), a corresponding −K value, data group name of the adjustment item α(nT) and data group name of the adjustment item β(mT) are read from the second table 34-2 in accordance with the judged disk type and designated record velocity magnification factor (S4). By using as selection information the read data group names of the adjustment items α(nT) and β(mT), the data groups of the adjustment items α(nT) and β(mT) are read from the first table 34-1 (S5). The record strategy is formed by combining the read adjustment values: −K value, α(nT) value and β(mT) value, and set to the record signal adjustment circuit 26 to prepare for data record (S6). After a record start command is received from the operator, the time axis adjustment of the record signal starts. The adjusted record signal drives the laser generating circuit to write data in the optical disk 10 (S7).

EXAMPLE 2

Figure 5:
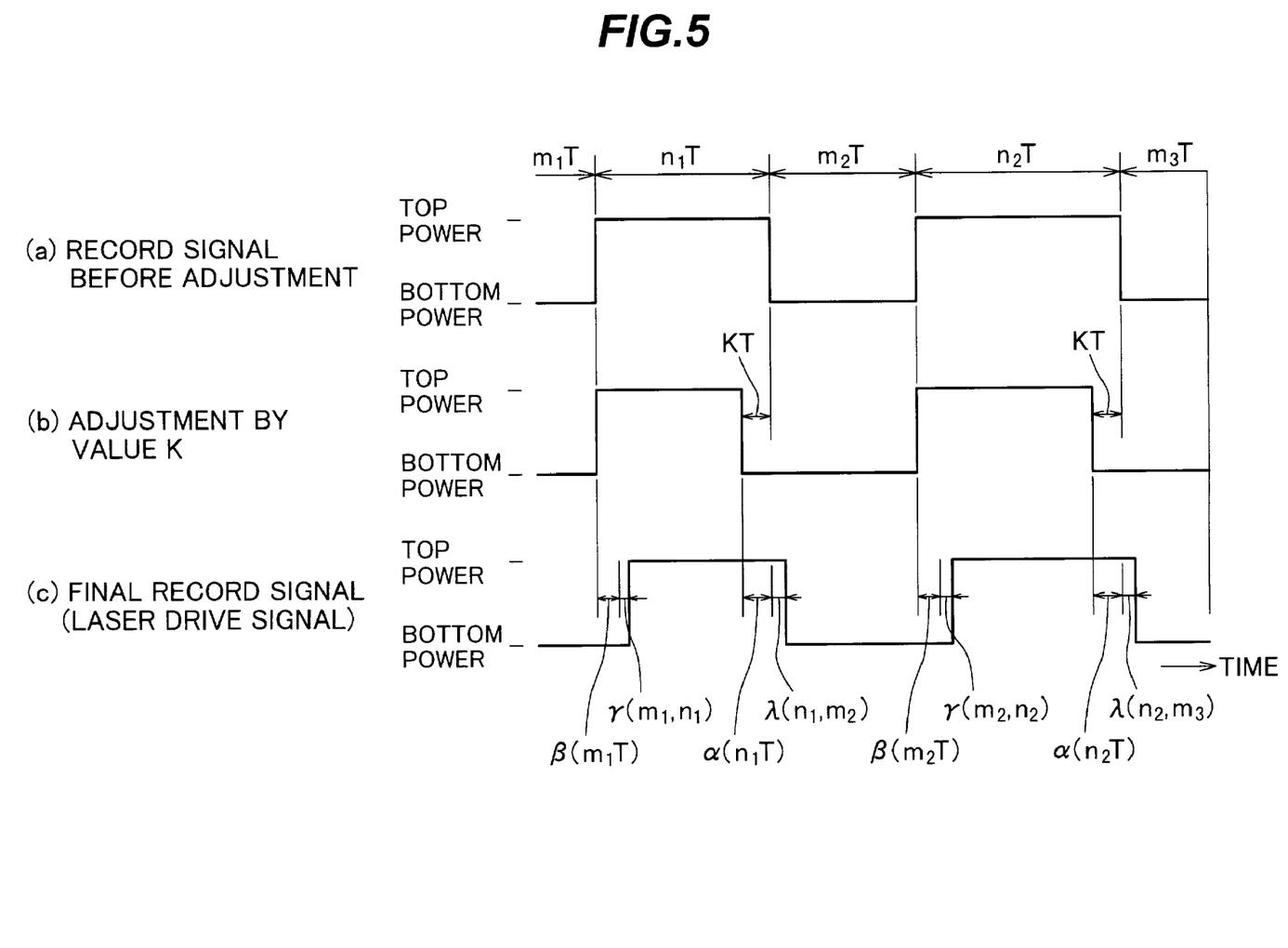
FIG. 5 is a waveform diagram illustrating the concept of time axis adjustment by a record strategy of $(n-K)T+\alpha(nT)-\beta(mT)-\gamma(m,n)+\lambda(n,m)$.

Although the −K value, α(nT) value and β(mT) value are adopted as the adjustment items in Example 1, other adjustment items may be added. For example, as a longer pit is formed, heat is accumulated more so that there is the tendency that the pit front end elongates forward (opposite to the record progressive direction). In this case, the radiation start timing of a laser beam having a record power for forming the front end of the pit is delayed more than when a shorter pit is formed. As a shorter land is formed, heat for forming the next pit is conducted via the land to the preceding pit so that there is the tendency that the back end of the preceding pit elongates backward (in the record progressive direction). In this case, the radiation end timing of a laser beam having a record power for forming the back end of the preceding pit is advanced more than when a longer land is formed. FIG. 5 is a conceptual diagram illustrating time axis adjustment by a record strategy of −(n−K)T+α(nT)−β(mT)−γ(m,n)+λ(n,m), the last two adjustment items being added for adjusting the top power radiation start timing to be suitable for a pit length and adjusting the top power radiation end timing to be suitable for a land length. A record signal waveform indicated at (a) is before adjustment, a record signal waveform indicated at (b) is after adjustment by an adjustment item −KT, and a record signal waveform indicated at (c) and to be finally used for laser drive is after further adjustment by adjustment items +α(nT)+λ(n,m) and adjustment items −β(mT)−γ(m,n).

The first table 34-1 of the adjustment data storage device 34 stores a plurality type of data groups of the adjustment item α(nT) (Table 1), a plurality type of data groups of the adjustment item β(mT) (Table 2) as well as a plurality type of data groups of the adjustment item γ(n,m) and a plurality type of data groups of the adjustment item λ(m,n). Table 4 shows examples of a plurality type of data groups of the adjustment item γ(m,n) stored in the first table 34-1. In Table 4, the value of the adjustment item γ(m,n) is represented by a ratio (%) relative to the value at 1T. In Table 4, the adjustment amount of the adjustment item γ(m,3) at the next pit length of 3T is not defined because the adjustment amount of the adjustment item β(mT) is set in such a manner that the adjustment amount of the adjustment item γ(m,3) at the next pit length of 3T becomes 0.

TABLE 4

| Data Group Name | Bit Length nT | γ(m,n) value Preceding land length mT | | | | | | | | |
|---|---|---|---|---|---|---|---|---|---|---|
| | | 3T | 4T | 5T | 6T | 7T | 8T | 9T | 10T | 11T |
| C1 | 4T | 2% | 0% | 0% | 0% | 0% | 0% | 0% | 0% | 0% |
| | 5T | 4% | 2% | 0% | 0% | 0% | 0% | 0% | 0% | 0% |
| | 6T–11T | 5% | 3% | 1% | 0% | 0% | 0% | 0% | 0% | 0% |
| C2 | 4T | 1% | 0% | 0% | 0% | 0% | 0% | 0% | 0% | 0% |
| | 5T | 2% | 1% | 0% | 0% | 0% | 0% | 0% | 0% | 0% |
| | 6T–11T | 3% | 2% | 1% | 0% | 0% | 0% | 0% | 0% | 0% |

Table 5 shows examples of a plurality type of data groups of the adjustment item λ(n,m) stored in the first table 34-1. In Table 5, the value of the adjustment item λ(n,m) is represented by a ratio (%) relative to the value at 1T. In Table 5, the adjustment amount of the adjustment item λ(n,3) at the next land length of 3T is not defined because the adjustment amount of the adjustment item α(nT) is set in such a manner that the adjustment amount of the adjustment item λ(n,3) at the next land length of 3T becomes 0.

TABLE 5

| Data Group Name | Next Land Length mT | λ(n,m) value Bit length nT | | | | | | | | |
|---|---|---|---|---|---|---|---|---|---|---|
| | | 3T | 4T | 5T | 6T | 7T | 8T | 9T | 10T | 11T |
| D1 | 4T | 1% | 0% | 0% | 0% | 0% | 0% | 0% | 0% | 0% |
| | 5T | 4% | 2% | 0% | 0% | 0% | 0% | 0% | 0% | 0% |
| | 6T–11T | 6% | 3% | 1% | 0% | 0% | 0% | 0% | 0% | 0% |
| D2 | 4T | 1% | 0% | 0% | 0% | 0% | 0% | 0% | 0% | 0% |
| | 5T | 2% | 1% | 0% | 0% | 0% | 0% | 0% | 0% | 0% |
| | 6T–11T | 4% | 2% | 0% | 0% | 0% | 0% | 0% | 0% | 0% |

Table 6 shows examples of data stored in the second table 34-2.

TABLE 6

| Disk ID | Record velocity magnification Factor | −K value | Data group name of α(nT) value | Data group name of β(mt) value | Data group name of γ(m,n) value | Data group name of λ(n,m) value |
|---|---|---|---|---|---|---|
| ID11 | 1x | −1.2 | A1 | B2 | C1 | D2 |
| | 4x | −0.5 | A1 | B2 | C1 | D3 |
| | 8x | −0.2 | A1 | 83 | C2 | D3 |
| | 12x | +0.2 | A2 | B3 | C2 | D4 |
| ID12 | 1x | −1.0 | A3 | B4 | C1 | D3 |
| | 4x | −0.4 | A3 | B5 | C2 | D4 |
| | 8x | 0 | A3 | B5 | C2 | D4 |

The operation of forming a record strategy and setting it to the record signal adjustment circuit 26 by the control unit 38 is similar to that described with reference to FIG. 4. Namely, a corresponding −K value, and data group names of α(nT), β(mT), γ(m,n) and λ(n,m) are read from the second table 34-2 in accordance with the disk type and record velocity magnification factor. In accordance with the read data group names, the values of α(nT), β(mT), γ(m,n) and λ(n,m) are read from the first table 34-1. The record strategy is formed by combining these values and set to the record signal adjustment circuit 26.

EXAMPLE 3

Figure 6:
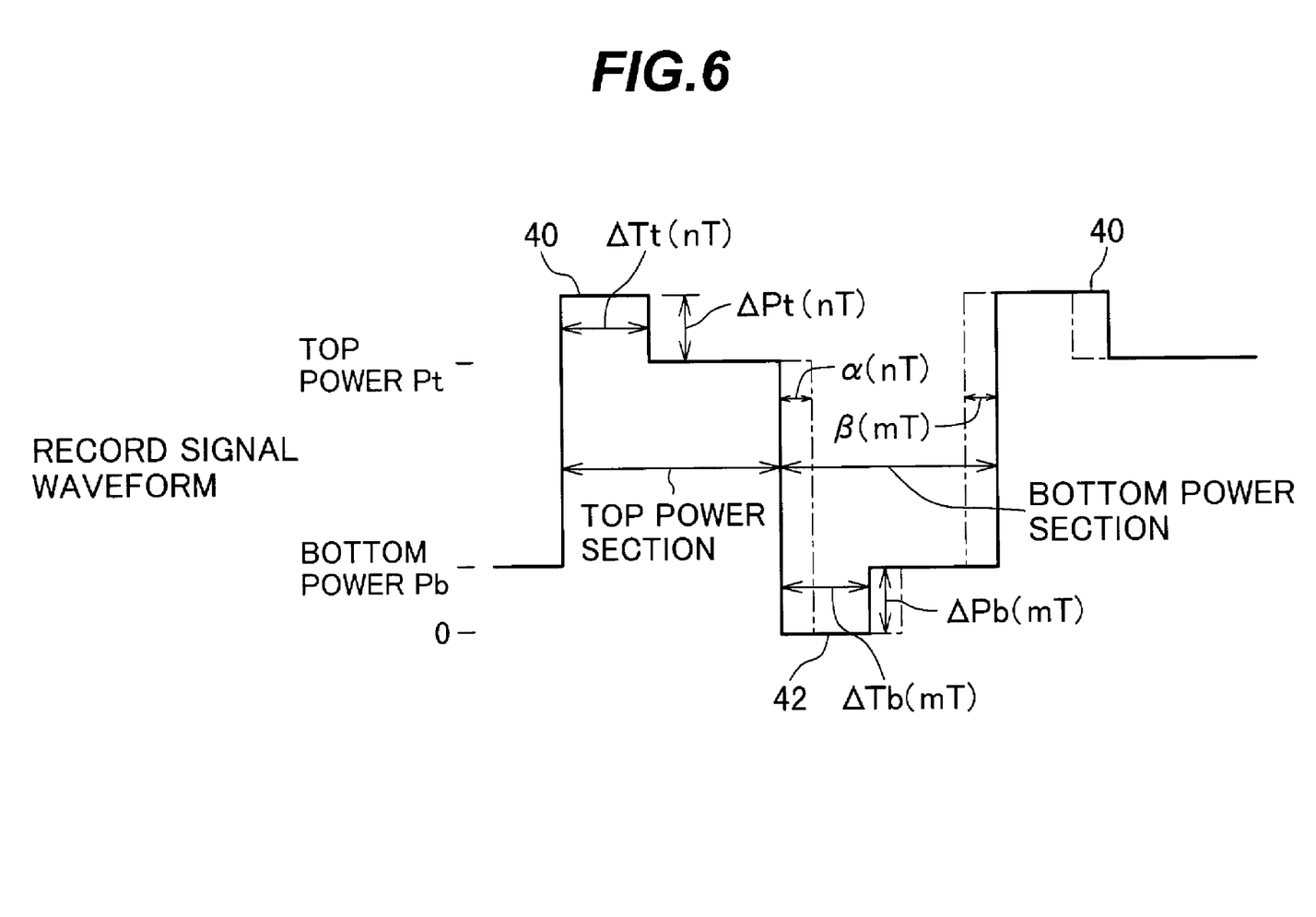
FIG. 6 is a waveform diagram of a record signal added with a top power addition pulse and a bottom power off pulse.

A waveform such as shown in FIG. 6 is used in some cases as the record signal waveform. A top power addition pulse 40 is added at the start of the top power (to raise the level higher than the top power) to reliably form the bit front end. A bottom power off pulse 42 is added at the start of the bottom power (to lower the level lower than the bottom power) to shut the heat generated when the preceding pit was formed and not to adversely affect the next bit formation. In other cases, the pulse width ΔTt(nT) and amplitude ΔPt(nT) of the top power addition pulse 40 are changed with the pit length nT and the pulse width ΔTb(mT) and amplitude ΔPb(mT) of the bottom power off pulse 42 are changed with the land length mT. A plurality type of data groups are therefore stored in the first table 34-1 for each of the adjustment items ΔTt(nT), ΔPt(nT), ΔTb(mT) and ΔPb(mT). Table 7 shows an example of the table format (without data values) for a plurality type of data groups E1, E2, E3, . . . of the pulse width ΔTt(nT) of the top power addition pulse 40 to be stored in the first table 34-1.

TABLE 7

| Data Group Name | ΔTt(nT) value Bit length nT | | | | | | | | |
|---|---|---|---|---|---|---|---|---|---|
| | 3T | 4T | 5T | 6T | 7T | 8T | 9T | 10T | 11T |
| E1 | | | | | | | | | |
| E2 | | | | | | | | | |

Table 8 shows an example of the table format (without data values) for a plurality type of data groups F1, F2, F3, . . . of the amplitude ΔPt(nT) of the top power addition pulse 40 to be stored in the first table 34-1.

TABLE 8

| Data Group Name | ΔPt(nT) value Pit length nT | | | | | | | | |
|---|---|---|---|---|---|---|---|---|---|
| | 3T | 4T | 5T | 6T | 7T | 8T | 9T | 10T | 11T |
| F1 | | | | | | | | | |
| F2 | | | | | | | | | |

Table 9 shows an example of the table format (without data values) for a plurality type of data groups G1, G2, G3, . . . of the pulse width ΔTb(mT) of the bottom power off pulse 42 to be stored in the first table 34-1.

TABLE 9

| Data Group Name | ΔTb(mT) value Preceding land length mT | | | | | | | | |
|---|---|---|---|---|---|---|---|---|---|
| | 3T | 4T | 5T | 6T | 7T | 8T | 9T | 10T | 11T |
| G1 | | | | | | | | | |
| G2 | | | | | | | | | |

Table 10 shows an example of the table format (without data values) for a plurality type of data groups H1, H2, H3, . . . of the pulse width ΔPb(mT) of the bottom power off pulse 42 to be stored in the first table 34-1.

TABLE 10

| Data Group Name | $\Delta Pb(mT)$ value Preceding land length mT | | | | | | | | |
|---|---|---|---|---|---|---|---|---|---|
| | 3T | 4T | 5T | 6T | 7T | 8T | 9T | 10T | 11T |
| H1 | | | | | | | | | |
| H2 | | | | | | | | | |

In addition, the first table 34-1 stores a plurality type of data groups of the adjustment item $\alpha(nT)$ (Table 1) and a plurality type of data groups of the adjustment item $\beta(mT)$ (Table 2). Tables 11(1) and 11(2) show an example of data stored in the second table 34-2.

TABLE 11 (1)

| Disk ID | Record velocity magnification Factor | −K value | Data group name of $\alpha(nT)$ value | Data group name of $\beta(mt)$ value | Data group name of $\Delta Tt(nT)$ value | Data group name of $\Delta Pt(nT)$ value |
|---|---|---|---|---|---|---|
| ID21 | 1x | −1.2 | A1 | B2 | E1 | F2 |
| | 4x | −0.5 | A1 | B2 | E1 | F3 |
| | 8x | −0.2 | A1 | B3 | E2 | F3 |
| | 12x | +0.2 | A2 | B3 | E2 | F4 |
| ID22 | 1x | −1.0 | A3 | B4 | E1 | F3 |
| | 4x | −0.4 | A3 | B5 | E2 | F4 |
| | 8x | 0 | A3 | B5 | E2 | F4 |

TABLE 11 (2)

| Disk ID | Record velocity magnification Factor | −K value | Data group name of $\alpha(nT)$ value | Data group name of $\beta(mt)$ value | Data group name of $\Delta Tb(mT)$ value | Data group name of $\Delta Pb(mT)$ value |
|---|---|---|---|---|---|---|
| ID21 | 1x | −1.2 | A1 | B2 | G1 | H3 |
| | 4x | −0.5 | A1 | B2 | G1 | H2 |
| | 8x | −0.2 | A1 | B3 | G2 | H2 |
| | 12x | +0.2 | A2 | B3 | G2 | H2 |
| ID22 | 1x | −1.0 | A3 | B4 | G1 | H1 |
| | 4x | −0.4 | A3 | B5 | G1 | H1 |
| | 8x | 0 | A3 | B5 | G2 | H2 |

The operation of forming a record strategy and setting it to the record signal adjustment circuit 26 by the control unit 38 is similar to that described with reference to FIG. 4. Namely, a corresponding −K value, and data group names of $\alpha(nT)$, $\beta(mT)$, $\Delta Tt(nT)$, $\Delta Pt(nT)$, $\Delta Tb(mT)$ and $\Delta Pb(mT)$ are read from the second table 34-2 in accordance with the disk type and record velocity magnification factor. In accordance with the read data group names, the values of $\alpha(nT)$, $\beta(mT)$, $\Delta Tt(nT)$, $\Delta Pt(nT)$, $\Delta Tb(mT)$ and $\Delta Pb(mT)$ are read from the first table 34-1. The record strategy is formed by combining these values and set to the record signal adjustment circuit 26.

In the above embodiment, as the unit of the adjustment item, each of the adjustment parameters −K, $\alpha(nT)$, $\beta(mT)$, $-\gamma(m,n)$, $+\lambda(n,m)$, $\Delta Tt(nT)$, $\Delta Pt(nT)$, $\Delta Tb(mT)$ and $\Delta Pb(mT)$ is used. The embodiment is not limited only thereto, but a communication of a plurality of adjustment parameters can be used as the unit of the adjustment item. For example, in the above-described Examples, Table for the data groups of the adjustment item $\alpha(nT)$ and Table for the data groups of the adjustment item $\beta(mT)$ are prepared separately in the first table 34-1. Instead, as shown in Table 12, data groups AB1, AB2, AB3, . . . of a combination of the adjustment items $\alpha(nT)$ and $\beta(mT)$ may be stored in the first table 34-1. In this case, the second table 34-2 stores the data group names AB1, AB2, AB3, . . . as the "combined data group name of the $\alpha(nT)$ and $\beta(mT)$ values" in place of the "data group name of the $\alpha(nT)$ value" and "data group name of the $\beta(mT)$ value".

TABLE 12

| Data Group Name | | $\alpha(nT)$ value, $\beta(mT)$ value Bit length nT, Land Length mT | | | | | | |
|---|---|---|---|---|---|---|---|---|
| | | 3T | 4T | 5T | 6T | 7T | 10T | 11T |
| AB1 | $\alpha(nT)$ value | 15% | 10% | 7% | 4% | 2% | 0% | 4% |
| | $\beta(mT)$ value | 6% | 5% | 2% | 0% | 0% | 0% | 0% |
| AB2 | $\alpha(nT)$ value | 13% | 9% | 6% | 3% | 0% | 0% | 2% |
| | $\beta(mT)$ value | 4% | 2% | 0% | 0% | 0% | 0% | 0% |
| AB3 | $\alpha(nT)$ value | 12% | 7% | 4% | 2% | 0% | 0% | 0% |
| | $\beta(mT)$ value | 4% | 2% | 0% | 0% | 0% | 0% | 0% |

In Example 2, Table for the data groups of the adjustment item $\alpha(nT)$, Table for the data groups of the adjustment item $\beta(mT)$, Table for the data groups of the adjustment amount $\gamma(m,n)$ and Table for the data groups of the adjustment amount $\lambda(n,m)$ are prepared separately in the first table 34-1. As seen from FIG. 5, the adjustment amount of the radiation start timing of the laser power having the top power is $\beta(mT)+\gamma(m,n)$ and that of the radiation end timing is $\alpha(nT)+\lambda(n,m)$. Therefore, instead of separately preparing Tables for the adjustment items $\alpha(nT)$, $\beta(mT)$, $\gamma(m,n)$ and $\lambda(n,m)$, Table for the data groups of the adjustment items $\beta(mT)+\gamma(m,n)$ and Table for the data groups of the adjustment items $\alpha(nT)+\lambda(n,m)$ may be prepared and stored in the first table 34-1. In this case, the second table 34-2 stores the data group identification items "data group name of the value $\alpha(nT)+\lambda(n,m)$" and "data group name of the value $\beta(nT)+\gamma(n,m)$" in place of the data group identification items "data group name of the value $\alpha(nT)$" and "data group name of the value $\beta(mT)$" of Table 3.

In the above-described Examples, the value −K is directly store in the second table 34-2 for each of the disk type and record velocity magnification factor. In addition, the second table 34-2 may directly store information of a target asymmetry value and a running optimum power control (ROPC) for each combination of the disk type and record velocity magnification factor, this information being independent from the bit length and land length.

In the above-described embodiment, although the invention is applied to optical data record of an optical disk having CD standards, the invention is also applicable to optical data record of an optical disk having a different standard of a mark length record type such as DVD standards.

The present invention has been described in connection with the preferred embodiments. The invention is not limited only to the above embodiments. It is apparent that various modifications, improvements, combinations, and the like can be made by those skilled in the art.

What we claim are:

1. A method of adjusting a record signal waveform to be recorded on an optical disk, comprising:

(a) preparing a plurality of adjustment data groups respectively on a plurality of adjustment items of a record signal waveform, the adjustment data groups being comprised of a plurality of adjustment data including an adjustment datum or a plurality of an adjustment datum, which is prepared based on mark length, previous space length or a combination of mark length and a following space length of a record signal or based on recording linear velocity, and further preparing a plurality of combination information, the combination information being prepared based on disk type information and specifying the adjustment data for each of the plurality of adjustment items for adjusting the record signal waveform;

(b) selecting the adjustment data from each of the adjustment data groups in accordance with combination information; and (c) adjusting the record signal waveform in accordance with the adjustment data selected in accordance with the combination information of the adjustment data, wherein the adjustment data are prepared based on mark length, previous space length, a combination of previous space length and mark length, or a combination of mark length and following space length of the record signal, and are prepared such that the same adjustment data may be shared in the plurality of combination information.

2. A method of adjusting a record signal waveform to be recorded on an optical disk, comprising:

(a) preparing a plurality of adjustment data groups respectively on a plurality of adjustment items of a record signal waveform, the adjustment data groups being comprised of a plurality of adjustment data including an adjustment datum or a plurality of an adjustment datum, which is prepared based on mark length, previous space length, a combination of previous space length and mark length or a combination of mark length and following space length of the record signal waveform or recording linear velocity, and further preparing a plurality of combination information, the combination information being prepared based on the recording linear velocity and specifying the adjustment data for each of the plurality of adjustment items for adjusting the record signal waveform;

(b) selecting the adjustment data from each of the adjustment data groups in accordance with the combination information; and (c) adjusting the record signal waveform in accordance with the adjustment data selected in accordance with the combination information of the adjustment data, wherein the adjustment data are prepared based on mark length, previous space length, a combination of previous space length and mark length, or a combination of mark length and a following space length of the record signal, and are prepared such that the same adjustment data may be shared in the plurality of combination information.

3. A method of adjusting a record signal waveform to be recorded on an optical disk, comprising:

(a) preparing a plurality of adjustment data groups respectively on a plurality of adjustment items of the record signal waveform, the adjustment data groups being comprised of a plurality of adjustment data including an adjustment datum or a plurality of an adjustment datum, which is prepared based on mark length, previous space length, a combination of previous space length and mark length or a combination of mark length and a following space length of a record signal or based on recording linear velocity, and further preparing a plurality of combination information, the combination information being prepared based on disk type information and the recording linear velocity and specifying the adjustment data for each of a plurality of the adjustment items for adjusting the record signal waveform;

(b) selecting the adjustment data from each of the adjustment data groups in accordance with the combination information; and (c) adjusting the record signal waveform in accordance with the adjustment data selected in accordance with the combination information of the adjustment data, wherein the adjustment data is prepared based on mark length, previous space length, a combination of previous space length and mark length, or a combination of mark length and following space length of the record signal, and are prepared such that the same adjustment data may be shared in the plurality of combination information.

4. A method of adjusting a record signal waveform to be recorded on an optical disk according to claim 3, wherein the adjustment item includes a time axis adjustment item.

5. A method of adjusting a record signal waveform to be recorded on an optical disk according to claim 4, wherein the time axis adjustment item includes at least one value of $\alpha(nT)$, $y(mT)$, $\gamma(m,n)$ and $\lambda(n,m)$ of a record strategy of $(n-K)T+\alpha(nT)-\gamma(mT)$ or a record strategy of $(n-K)T+\alpha(nT)-\beta(mT)-y(m,n)+\lambda(n,m)$.

6. A method of adjusting a record signal waveform to be recorded on an optical disk according to claim 4, wherein the time axis adjustment item includes a pulse width of a pulse to be added to a portion near a rising edge of the record signal waveform.

7. A method of adjusting a record signal waveform to be recorded on an optical disk according claim 3, wherein the adjustment item includes record power.

8. A method of adjusting a record signal waveform to be recorded on an optical disk according to claim 7, wherein the the record power includes a pulse amplitude of a pulse to be added to a portion near a rising edge of the record signal waveform.

9. A method of storing record signal waveform adjustment data for recording an optical disk, comprising:

(a) preparing a plurality of types of adjustment data on each of a plurality of adjustment items, and storing a plurality of adjustment data in a first memory; and (b) storing in a second memory, combination information that combines a plurality of the adjustment data of different types, each being selected from the plurality of types of adjustment data belonging to each of a plurality of the adjustment items in accordance with the disk type, wherein the adjustment data stored in the first memory is stored such that the same adjustment data may be shared in a plurality of the combination information and combined with the plurality of types of the adjustment data to adjust a record signal waveform.

10. A method of storing record signal waveform adjustment data for recording an optical disk, comprising:

(a) preparing a plurality of type of adjustment data on each of a plurality of adjustment items and storing a plurality of adjustment data in a first memory; and (b) storing in a second memory combination information that combines a plurality of adjustment data of different types, each being selected from the plurality of adjustment data of different types belonging to each of the plurality of adjustment items in accordance with recording linear velocity, wherein the adjustment data stored in the first memory is stored such that the same adjustment data may be shared in a plurality of combination information and combined with a plurality of types of adjustment data to adjust a record signal waveform.

11. A method of storing record signal waveform adjustment data for recording an optical disk, comprising:
   (a) preparing a plurality of types of adjustment data on each of a plurality of adjustment items, and storing a plurality of adjustment data in a first memory; and
   (b) storing in a second memory, combination information that combines a plurality of the adjustment data of different types belonging to each of the plurality of the adjustment items in accordance with the disk type and a recording linear velocity,
   wherein the adjustment data stored in the first memory is stored such that the same adjustment data may be shared in a plurality of the combination information and combined with a plurality of types of the adjustment data to adjust a record signal waveform.

12. A method of storing record signal waveform adjustment data for recording an optical disk according to claim 11, wherein the adjustment items include an item whose adjustment data varies according to a length of a record signal.

13. A method of storing record signal waveform adjustment data for recording an optical disk according to claim 12, wherein the adjustment data of the adjustment item whose adjustment data does not vary according to a length of a record signal may be directly stored in the second memory as a selection datum of the combination information.

14. An optical disc recorder comprising:
   a storage device that stores a first table a plurality of adjustment data groups respectively on a plurality of adjustment items of record signal waveform, the adjustment data groups being comprised of a plurality of adjustment data including an adjustment datum or a set of a plurality of adjustment datum which is prepared based on mark length, previous space length, a combination of previous space length and mark length or a combination of mark length and following space length of the record signal or based on a recording linear velocity, and a second table storing a plurality of combination information, the combination information being prepared based on disk type information and specifying the adjustment data for each of a plurality of the adjustment items for adjusting the record signal waveform; and
   a record signal adjusting device that reads the combination information from the second table in accordance with the disk type information, selects the adjustment data corresponding to each adjustment item from the first table in accordance with the combination information of the adjustment data, and adjusts the record signal waveform in accordance with the adjustment data selected in accordance with the combination information,
   wherein the adjustment data stored in the first table and prepared dependent on mark length, previous space length, a combination of previous space length and mark length or a combination of mark length and following space length of the record signal are stored such that the same adjustment data may be shared in a plurality of combination information.

15. An optical disc recorder comprising:
   a storage device that stores a first table storing a plurality of adjustment data groups respectively on a plurality of adjustment items of a record signal waveform, the adjustment data groups being comprised of a plurality of adjustment data including an adjustment datum or a set of a plurality of an adjustment datum, which is prepared based on mark length, previous space length, a combination of previous space length and mark length, or a combination of mark length and following space length of the record signal or based on a recording linear velocity, and a second table storing a plurality of combination information, the combination information being prepared based on the recording linear velocity and specifying the adjustment data for each of a plurality of adjustment items for adjusting the record signal waveform; and
   a record signal adjusting device that reads the combination information from the second table in accordance with the recording linear velocity, selects the adjustment data corresponding to each adjustment item from the first table in accordance with the combination information of the adjustment data, and adjusts the record signal waveform in accordance with the adjustment data selected in accordance with the combination information,
   wherein the adjustment data stored in the first table and prepared based on mark length, previous space length, a combination of previous space length and mark length, or a combination of mark length and following space of the record signal are stored such that the same adjustment data may be shared in the plurality of combination information.

16. An optical disc recorder comprising:
   a storage device that stores a first table storing a plurality of adjustment data groups respectively on a plurality of adjustment items of a record signal waveform, the adjustment data groups being a set of a plurality of adjustment data, the adjustment data being an adjustment datum or a set of a plurality of an adjustment datum, the adjustment datum being prepared based on mark length, previous space length, a combination of previous space length and mark length, or a combination of mark length and following space length of the record signal or based on a recording linear velocity, and a second table storing a plurality of combination information, the plurality of combination information being prepared based on the disk type information and the recording linear velocity and specifying the adjustment data for each of a plurality of adjustment items for adjusting the record signal waveform; and
   a record signal adjusting device that reads the combination information of the adjustment data to be used for each adjustment item from the second table in accordance with the disk type and the recording linear velocity, selects the adjustment data corresponding to each adjustment item from the first table in accordance with the combination information of the adjustment data, and adjusts the record signal waveform in accordance with the adjustment data selected in accordance with the combination information,
wherein the adjustment data stored in the first table and prepared based on mark length, previous space length, a combination of previous space length and mark length or a combination of mark length and following space of the record signal are stored such that the same adjustment data may be shared in the plurality of combination information.

* * * * *